United States Patent
Huang

(10) Patent No.: US 9,055,587 B2
(45) Date of Patent: Jun. 9, 2015

(54) METHOD AND SYSTEM FOR REALIZING BUFFER STATUS REPORTING

(75) Inventor: Yada Huang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 23 days.

(21) Appl. No.: 13/520,019

(22) PCT Filed: Mar. 30, 2011

(86) PCT No.: PCT/CN2011/072303
§ 371 (c)(1),
(2), (4) Date: Jun. 29, 2012

(87) PCT Pub. No.: WO2011/160480
PCT Pub. Date: Dec. 29, 2011

(65) Prior Publication Data
US 2013/0107722 A1    May 2, 2013

(30) Foreign Application Priority Data
Jun. 21, 2010   (CN) .......................... 2010 1 0210934

(51) Int. Cl.
*H04J 1/16* (2006.01)
*H04W 72/04* (2009.01)
(Continued)

(52) U.S. Cl.
CPC ............ *H04W 72/048* (2013.01); *H04W 28/12* (2013.01); *H04W 72/1221* (2013.01)

(58) Field of Classification Search
CPC .............. H04W 72/04; H04W 72/048; H04W 72/0413; H04W 72/0406; H04W 72/0486; H04W 72/1284; H04W 28/0278
USPC .................................. 370/241–252, 329–341
See application file for complete search history.

(56) References Cited

U.S. PATENT DOCUMENTS

2009/0052388 A1* 2/2009 Kim et al. ...................... 370/329
2009/0113086 A1* 4/2009 Wu et al. .......................... 710/56
(Continued)

FOREIGN PATENT DOCUMENTS

CN      101932019 A     12/2010
KR    20100034165 A      4/2010

OTHER PUBLICATIONS

"BSR for Carrier Aggregation"; 7.1.9, Nokia Siemens Networks, Nokia Corporation, Discussion and Decision; 3GPP TSG-RAN WG2 Meeting #70, Montreal, Canada, May 10-14, 2010; R2-102805; See pp. 1-2.

(Continued)

Primary Examiner — Kan Yuen
(74) Attorney, Agent, or Firm — Ling and Yang Intellectual Property

(57) ABSTRACT

The present invention discloses a method for realizing buffer status reporting. The method includes the following steps: a user equipment reporting a buffer status of a logical channel by using one of an original buffer status level format and a newly-added buffer status level format; wherein, the newly-added buffer status level format comprises a plurality of data-amount-range boundary values which are higher than a maximum data-amount-range boundary value in the original buffer status level format. The present invention also discloses a system and user equipment for realizing buffer status reporting. With the invention, the accuracy of the buffer status reported by the user in a long term evolution-advanced (LTE-A) system can be improved.

8 Claims, 3 Drawing Sheets

(51) Int. Cl.
*H04W 28/12* (2009.01)
*H04W 72/12* (2009.01)

(56) References Cited

U.S. PATENT DOCUMENTS

2009/0125650 A1   5/2009  Sebire
2011/0310800 A1*  12/2011 Lin et al. .................. 370/328
2011/0310937 A1*  12/2011 Lin et al. .................. 375/219

OTHER PUBLICATIONS

Discussion and Decision; "BSR for Carrier Aggregation", Nokia Siemens Networks, Nokia Corporation, 7.1.9; 3GPP TSG-RAN WG2 Meeting #70; Montreal, Canada, May 10-14, 2010; R2-102805, See pp. PA12-PA333.
Tdoc R2-102459: "On BSR for REL-10", Samsung, 3GPP TSG-RAN2#69bis meeting. Beijing, China, Apr. 16, 2010.
International Search Report for PCT/CN2011/072303 dated Jun. 22, 2011.

* cited by examiner

Channel (PUSCH). When the UE triggers a BSR, and only one LCG has data to be transmitted, the UE adopts a short BSR format to report BSR; when the BSR triggered by the UE is a Regular BSR or a Periodic BSR, and a plurality of LCGs have data to be transmitted, the UE adopts a long BSR format to report BSR; when the BSR triggered by the UE is a Padding BSR, a plurality of LCGs have data to be transmitted and the bit length of Padding of the MAC PDU is not sufficient to transmit long BSR format, the UE adopts the truncated BSR format to report Padding BSR.

In the above BSR formats, the BSR of a single LCG is indicated by 6 bits, and the value of these 6 bits is used as an index for query in a table of buffer size levels of the BSR. The specific contents of the table are as shown in Table 2.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |

TABLE 2-continued

| Index | Buffer Size (BS) value [bytes] |
|---|---|
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

The above formats of BSR and the definition on the transmission rules are all defined by the current LTE release 8 standard, and in order to adapt to the requirements of various radio services rapidly developing currently and in the future, the next evolved standard of LTE release 8 has also entered a formulating process, that is, the LTE-Advanced standard.

LTE-Advanced is a standard proposed by the 3rd Generation Partner Project (3GPP) organization for meeting the requirements of International Mobile Telecommunication-Advanced (IMT-Advanced) of the International Telecommunication Union (ITU). The LTE-Advanced system is an evolved version on the basis of LTE release 8 system, and it introduces many new techniques to meet the basic requirements of IMT-Advanced, wherein the most important technique is precisely carrier aggregation.

Due to the current lack of radio spectrum resources, the spectrum resources owned by various mobile operators all over the world are very scattered, and the index of peak rate required by IMT-Advanced is even higher (100 Mbps being supported under a high mobility while 1 Gbps being supported under a low mobility). The maximum bandwidth of 20 MHz according to the current LTE standard cannot meet the requirements of IMT-Advanced, so it needs to be extended to a higher bandwidth, for example, Frequency Division Duplexing (FDD) can support 80 MHz at most, Time Division Duplexing (TDD) can support 100 MHz at most, accordingly, the data amount that can be transmitted by the UE is also increased by several times relative to the LTE. In addition to increase of the bandwidth, to achieve an even higher rate, Multiple Input Multiple Output (MIMO) is also a core technique for increasing the throughput of the LTE-A system. Considering both increase of uplink bandwidth (five times of the bandwidth of LTE) and uplink double-stream MIMO (twice of the single-stream of LTE), the uplink rate of the UE in a LTE-A system will be increased to 10 times of that in the LTE system.

However, the original BSR table can only indicate data with a maximum of 150000 in a fine granularity, and all other services larger than 150000 belong to the same BSR level, that is, if the BSR table of LTE is still used, then the LTE-A services of large throughput will cause the network to be unable to distinguish the buffer status from 150000 to 1500000 of the UE, thus making it unable to allocate resources reasonably and efficiently. Therefore, the 3GPP meets the requirement of accurately reflecting the buffer status from 150000 to 1500000 in a case of large service throughput of the LTE-A by adding at least one new BSR table on the basis of BSR table of the LTE. Nevertheless, how to use these tables with the UE supporting a plurality of BSR tables is not determined yet.

SUMMARY OF THE INVENTION

The technical problem to be solved in the present invention is to provide a method and system for realizing buffer status reporting to improve the accuracy of the buffer status reported by the user in a LTE-A system.

In order to solve the above technical problem, the present invention provides a method for realizing buffer status reporting, comprising the following steps of:

a user equipment reporting a buffer status of a logical channel by using one of an original buffer status level format and a newly-added buffer status level format; wherein, the newly-added buffer status level format comprises a plurality of data-amount-range boundary values which are higher than a maximum data-amount-range boundary value in the original buffer status level format.

Wherein, the newly-added buffer status level format comprises a plurality of data amount levels, each of which corresponds to one data amount range; the data amount range corresponding to a last data amount level in the original buffer status level format refers to a range of values larger than the maximum data-amount-range boundary value, the data amount ranges corresponding to last M levels in the newly-added buffer status level format are data amount ranges that are larger than the maximum data-amount-range boundary value and have increasing values in order; M is an integer smaller than or equal to a number of data amount levels in the newly-added buffer status level format.

The method further comprises:

the user equipment selecting a buffer status level format to be used according to a data amount of a buffer in a logic channel group, and reporting a buffer status report of the logic channel group. Wherein, the step of the user equipment selecting a buffer status level format to be used according to a buffer data amount in a logic channel group, and reporting a buffer status report of the logic channel group comprises:

when the user equipment only reports the buffer status report of one logic channel group, if it is judged that the buffer data amount of the logic channel group is smaller than the maximum data-amount-range boundary value of the original buffer status level format, reporting the buffer status report of the logic channel group using the original buffer status level format; if it is judged that the buffer data amount of the logic channel group is not smaller than the maximum data-amount-range boundary value of the original buffer status level format, reporting the buffer status report of the logic channel group using the newly-added buffer status level format.

Wherein, the step of the user equipment selecting a buffer status level format to be used according to a buffer data amount in a logic channel group, and reporting a buffer status report of the logic channel group comprises:

when the user equipment reports the buffer status reports of four logic channel groups simultaneously, if it is judged that a maximum value of the buffer data amounts of the logic channel groups is smaller than the maximum data-amount-range boundary value of the original buffer status level format, reporting the buffer status reports of the logic channel groups using the original buffer status level format; if it is judged that maximum value of the buffer data amounts of the logic channel groups is not smaller than the maximum data-amount-range boundary value of the original buffer status level format, reporting the buffer status reports of the logic channel groups using the newly-added buffer status level format.

The method further comprises:

an evolved Node B determining which one of the original buffer status level format and the newly-added buffer status level format the user equipment should use, and informing the user equipment of a determination result;

the step of the user equipment reporting the buffer status of the logic channel using one of the original buffer status level format and the newly-added buffer status level format comprises: after receiving the determination result, the user equipment reporting the buffer status of the logic channel using the buffer status level format indicated by the evolved Node B.

Wherein, in the step of the evolved Node B determining which one of the original buffer status level format and the newly-added buffer status level format the user equipment should use, the evolved Node B determines which one of the original buffer status level format and the newly-added buffer status level format the user equipment should use according to traffic flow, data transmission rate or service attribute of the user equipment.

In order to solve the above technical problem, the present invention further provides a system for realizing buffer status reporting, comprising a user equipment, wherein, the user equipment is configured to report a buffer status of a logical channel by using one of an original buffer status level format and a newly-added buffer status level format; wherein, the newly-added buffer status level format comprises a plurality of data-amount-range boundary values which are higher than a maximum data-amount-range boundary value in the original buffer status level format.

Wherein, the newly-added buffer status level format comprises a plurality of data amount levels, each of which corresponds to one data amount range; the data amount range corresponding to a last data amount level in the original buffer status level format refers to a range of values larger than the maximum data-amount-range boundary value, the data amount ranges corresponding to last M levels in the newly-added buffer status level format are data amount ranges that are larger than the maximum data-amount-range boundary value and have increasing values in order; M is an integer smaller than or equal to a number of data amount levels in the newly-added buffer status level format.

Wherein, the user equipment is further configured to: select a buffer status level format to be used according to a data amount of a buffer in a logic channel group, and reporting a buffer status report of the logic channel group; wherein, when the buffer status report of only one logic channel group is reported, if it is judged that the buffer data amount of the logic channel group is smaller than the maximum data-amount-range boundary value of the original buffer status level format, report the buffer status report of the logic channel group using the original buffer status level format; if it is judged that the buffer data amount of the logic channel group is not smaller than the maximum data-amount-range boundary value of the original buffer status level format, report the buffer status report of the logic channel group using the newly-added buffer status level format; when the buffer status reports of four logic channel groups are reported simultaneously, if it is judged that a maximum value of the buffer data amounts of the logic channel groups is smaller than the maximum data-amount-range boundary value of the original buffer status level format, report the buffer status reports of the logic channel groups using the original buffer status level format; if it is judged that maximum value of the buffer data amounts of the logic channel groups is not smaller than the maximum data-amount-range boundary value of the original buffer status level format, report the buffer status reports of the logic channel groups using the newly-added buffer status level format.

The system further comprises an evolved Node B, the evolved Node B is configured to determine which one of the original buffer status level format and the newly-added buffer status level format the user equipment should use according to traffic flow, data transmission rate or service attribute of the user equipment, and inform the user equipment of a determination result.

In order to solve the above technical problem, the present invention further provides a user equipment for realizing buffer status reporting, and the user equipment is configured to:

report a buffer status of a logical channel by using one of an original buffer status level format and a newly-added buffer status level format; wherein, the newly-added buffer status level format comprises a plurality of data-amount-range boundary values which are higher than a maximum data-amount-range boundary value in the original buffer status level format.

Wherein, the newly-added buffer status level format comprises a plurality of data amount levels, each of which corresponds to one data amount range; the data amount range corresponding to a last data amount level in the original buffer status level format refers to a range of values larger than the maximum data-amount-range boundary value, the data amount ranges corresponding to last M levels in the newly-added buffer status level format are data amount ranges that are larger than the maximum data-amount-range boundary value and have increasing values in order; M is an integer smaller than or equal to a number of data amount levels in the newly-added buffer status level format.

The user equipment is further configured to:

select a buffer status level format to be used according to a data amount of a buffer in a logic channel group, and reporting a buffer status report of the logic channel group; wherein, when the buffer status report of only one logic channel group is reported, if it is judged that the buffer data amount of the logic channel group is smaller than the maximum data-amount-range boundary value of the original buffer status level format, report the buffer status report of the logic channel group using the original buffer status level format; if it is judged that the buffer data amount of the logic channel group is not smaller than the maximum data-amount-range boundary value of the original buffer status level format, report the buffer status report of the logic channel group using the newly-added buffer status level format; when the buffer status reports of four logic channel groups are reported simultaneously, if it is judged that a maximum value of the buffer data amounts of the logic channel groups is smaller than the maximum data-amount-range boundary value of the original buffer status level format, report the buffer status reports of the logic channel groups using the original buffer status level format; if it is judged that maximum value of the buffer data amounts of the logic channel groups is not smaller than the maximum data-amount-range boundary value of the original buffer status level format, report the buffer status reports of the logic channel groups using the newly-added buffer status level format. The user equipment is further configured such that:

receive a determination result sent from an evolved Node B after the evolved Node B determines which one of the original buffer status level format and the newly-added buffer status level format the user equipment should us according to traffic flow, data transmission rate or service attribute of the user equipment.

The scheme of the present invention can improve the accuracy of the user reporting the buffer status in a LTE-A system.

PREFERRED EMBODIMENTS OF THE PRESENT INVENTION

The format defined in LTE release 8 standard shown in Table 2 is called as original buffer status level format or as BSR table 0 in the present invention. The original buffer status level format comprises 64 data amount levels (i.e., levels 0 to 63), and each of the data amount level corresponds to one data amount range, the values of the end points of the data amount range are called as data-amount-range boundary values, wherein the boundary value, i.e., 150000, of the range corresponding to the level 63 is the maximum data-amount-range boundary value.

The examples of the present invention will be described in detail below with reference to the drawings. It should be pointed out that without conflict, the examples and the features of the examples in the present application can be combined in any manner.

The present invention defines one or more types of newly-added buffer status level formats, and the base station and the terminal can use a plurality of buffer status level formats simultaneously.

Figure 7:
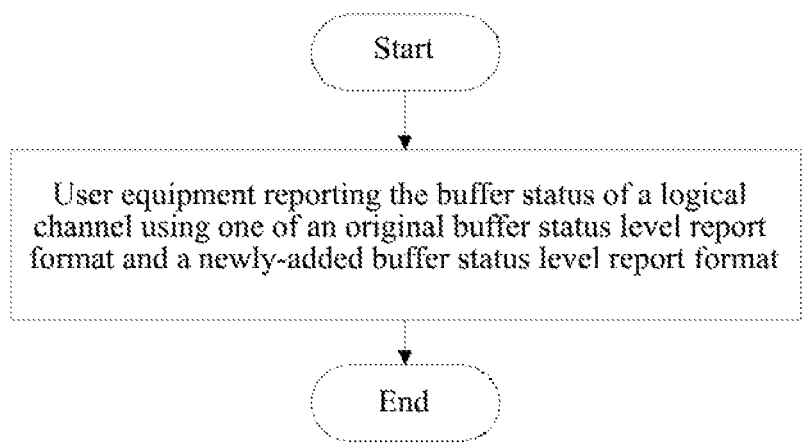
FIG. 7 illustrates the method for realizing buffer status reporting according to an example.

The newly-added buffer status level format comprises a plurality of data-amount-range boundary values which are higher than the maximum data-amount-range boundary value in the original buffer status level format. As shown in FIG. 7, the method for realizing buffer status reporting comprises: a user equipment reporting a buffer status of a logical channel using one of the original buffer status level format and the newly-added buffer status level format.

Description will be made below by taking adding one newly-added buffer status level format (called as BST table 1) as an example, and the manner of adding a plurality of newly-added buffer status level formats is the same, and the difference between different newly-added buffer status level formats lies in different indicated buffer data statuses.

The newly-added buffer status level format also comprises a plurality of data amount levels, the number of data amount levels may be the same with the number of data amount levels in the original buffer status level format, i.e., 64 levels, or may be different from the number of data amount levels in the original buffer status level format, i.e., greater than or smaller than 64. Each of the data amount level in the newly-added buffer status level format also corresponds to one data amount range, and the data amount values of different data amount ranges are not intersected.

There are many ways for configuring the newly-added buffer status level format, for example: the data amount range corresponding to a last data amount level in the original buffer status level format refers to a range of values larger than the maximum data-amount-range boundary value, the data amount ranges corresponding to last M levels in the newly-added buffer status level format are data amount ranges that are larger than the maximum data-amount-range boundary value and have increasing values in order; M is an integer smaller than or equal to the number of data amount levels in the newly-added buffer status level format.

Figure 1:
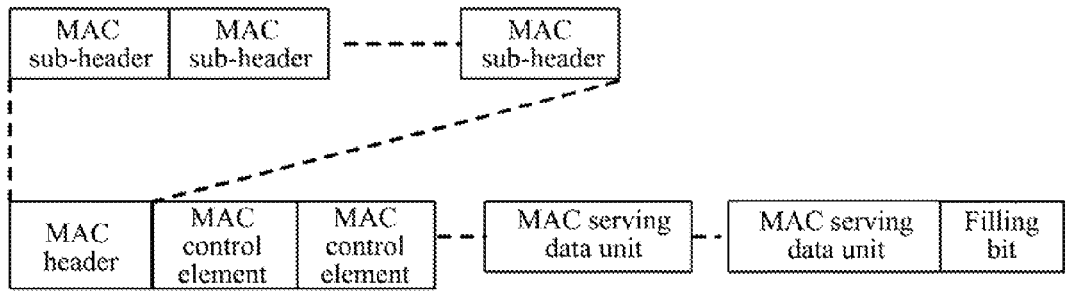
FIG. 1 illustrates the MAC PDU defined by the LTE standard.
Figure 2:
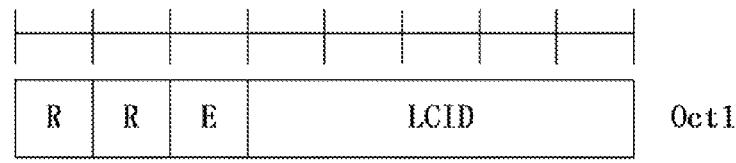
FIG. 2 to FIG. 4 illustrate the MAC sub-header defined by the LTE standard.
Figure 3:
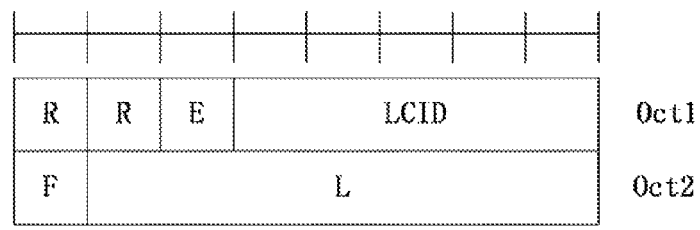
Figure 4:
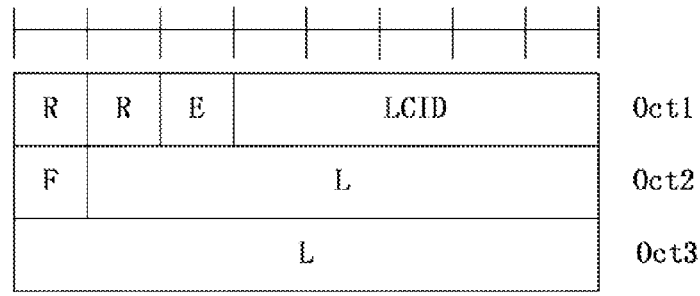
Figure 5:
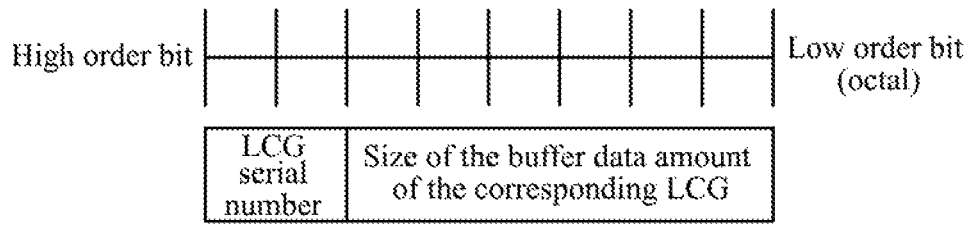
FIG. 5 illustrates the short BSR and truncated BSR defined by the LTE standard.
Figure 6:
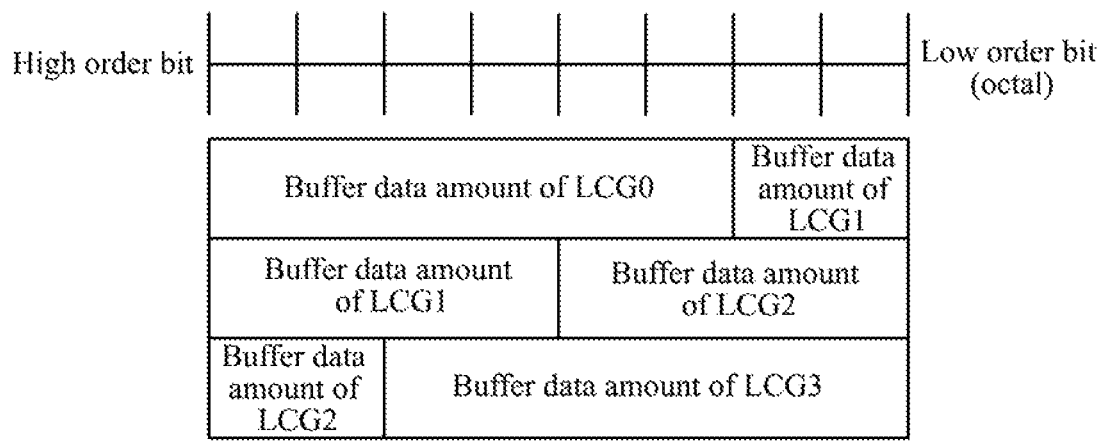
FIG. 6 illustrates the long BSR defined by the LTE standard.

Both the eNB and UE support carrier aggregation technology, and the UE can support a plurality of buffer status level formats, i.e., a plurality of BSR tables. The BSR table is the BSR table already defined in the LTE system, and the UE also supports the BSR table 1 newly defined in the present invention. The example is as shown in FIG. 3. The data amount values in the data amount ranges corresponding to the last 16 levels (i.e., levels 48 to 63) are all greater than the maximum data-amount-range boundary value 150000 in the original buffer status level format, the values of the corresponding data amount ranges increase in order as the values of the levels increase, and the data between 150000 and 1595876 are represented with fine granularity. The format shown in Table 3 is only for illustration, wherein the number of levels, the value of M, the size of the capacity of the data amount range corresponding to each level, and the maximum data-amount-range boundary value corresponding to the last level can all be modified according to the requirements of the system.

TABLE 3

| Level | Actual data amount (BS) [bytes] |
|---|---|
| 0 | BS = 0 |
| 1 | 0 < BS <= 107 |
| 2 | 107 < BS <= 125 |
| 3 | 125 < BS <= 146 |
| 4 | 146 < BS <= 171 |
| 5 | 171 < BS <= 200 |
| 6 | 200 < BS <= 234 |
| 7 | 234 < BS <= 274 |
| 8 | 274 < BS <= 321 |
| 9 | 321 < BS <= 376 |
| 10 | 376 < BS <= 440 |
| 11 | 440 < BS <= 515 |
| 12 | 515 < BS <= 603 |
| 13 | 603 < BS <= 706 |
| 14 | 706 < BS <= 826 |
| 15 | 826 < BS <= 967 |
| 16 | 967 < BS <= 1132 |
| 17 | 1132 < BS <= 1326 |
| 18 | 1326 < BS <= 1552 |
| 19 | 1552 < BS <= 1817 |
| 20 | 1817 < BS <= 2127 |
| 21 | 2127 < BS <= 2490 |
| 22 | 2490 < BS <= 2915 |
| 23 | 2915 < BS <= 3413 |
| 24 | 3413 < BS <= 3995 |
| 25 | 3995 < BS <= 4677 |
| 26 | 4677 < BS <= 5476 |
| 27 | 5476 < BS <= 6411 |
| 28 | 6411 < BS <= 7505 |
| 29 | 7505 < BS <= 8787 |
| 30 | 8787 < BS <= 10287 |
| 31 | 10287 < BS <= 12043 |
| 32 | 12043 < BS <= 14099 |
| 33 | 14099 < BS <= 16507 |
| 34 | 16507 < BS <= 19325 |
| 35 | 19325 < BS <= 22624 |
| 36 | 22624 < BS <= 26487 |
| 37 | 26487 < BS <= 31009 |
| 38 | 31009 < BS <= 36304 |
| 39 | 36304 < BS <= 42502 |
| 40 | 42502 < BS <= 49759 |
| 41 | 49759 < BS <= 58255 |
| 42 | 58255 < BS <= 68201 |
| 43 | 68201 < BS <= 79846 |

TABLE 3-continued

| Level | Actual data amount (BS) [bytes] |
|---|---|
| 44 | 79846 < BS <= 93479 |
| 45 | 93479 < BS <= 109439 |
| 46 | 109439 < BS <= 128125 |
| 47 | 128125 < BS <= 150000 |
| 48 | 150000 < BS <= 175612 |
| 49 | 175612 < BS <= 205595 |
| 50 | 205595 < BS <= 240699 |
| 51 | 240699 < BS <= 281796 |
| 52 | 281796 < BS <= 329909 |
| 53 | 329909 < BS <= 386238 |
| 54 | 386238 < BS <= 452184 |
| 55 | 452184 < BS <= 529390 |
| 56 | 529390 < BS <= 619778 |
| 57 | 619778 < BS <= 725599 |
| 58 | 725599 < BS <= 849488 |
| 59 | 849488 < BS <= 994529 |
| 60 | 994529 < BS <= 1164335 |
| 61 | 1164335 < BS <= 1363134 |
| 62 | 1363134 < BS <= 1595876 |
| 63 | BS > 1595876 |

In the present method, as for which buffer status level format is selected, it generally has two cases, namely, being determined by the user side, i.e., the UE, and being determined by the network side, i.e., the eNB.

These two implementation modes will be descried in detail below.

Mode one, the buffer status level format is determined by the UE.

The user equipment can select the buffer status level format to be used according to its own algorithm or a predefined rule.

For example, the user equipment selects the buffer status level format to be used according to the buffer data amount in the logic channel group, or determines the buffer status level format according to the error of reporting BSR (i.e., the range corresponding to each BSR level), and reports the BSR value in the buffer status level format corresponding to the buffer data amount of the logic channel group, i.e., reporting the corresponding status report.

Through explicit identification or predefined rule, the user equipment allows query of the actual value of the size of the buffer in the corresponding buffer status level format, i.e., the BSR table, after the network receives the BSR.

When the user equipment only reports the buffer status report of one logic channel group, i.e., reports Short BSR or Truncated BSR, if it is judged that the buffer data amount of the logic channel group is smaller than the maximum data-amount-range boundary value of the original buffer status level format, the buffer status report of the logic channel group is reported by using the original buffer status level format; if it is judged that the buffer data amount of the logic channel group is not smaller than the maximum data-amount-range boundary value of the original buffer status level format, the buffer status report of the logic channel group is reported by using the newly-added buffer status level format. For example, when the data amount of this LCG is greater than 150000, BSR table 1 is selected, otherwise, the BSR table 0 is selected.

Other threshold values, in addition to the maximum data-amount-range boundary value in the BSR table 0, can also be used.

According to the actual buffer sizes of the LCG, for example, when 175612<BS<=205595, if the maximum value of the BSR table 0 is set as the selecting threshold, i.e., 150000, the data amount BS of the LCG is greater than 150000, then the UE selects the BSR table 1 according to the above rule, and the actually reported BSR level is 49. That is, the UE determines according to whether the actual buffer meets the selecting threshold of the BSR table. The minimum value 107 of the BSR table 1 can also be flexibly set as the selecting threshold, and when BS<107, the BSR table 0 is selected, otherwise, the BSR table 1 is selected. This threshold value may be notified to the UE by the base station through signaling, and different threshold values can be designated for various UEs; or this threshold is statically designated according to the predefined rule of the protocol, which can reduce modification to the signaling.

Aside from the above way for determining the BSR table according to the threshold, selecting the BSR table through the error law can also enables the UE to select the BSR table 1, that is because at this moment, the BS may be represented by the level 49 of the BSR table 1, or by the level 63 of the BSR table 0, but the buffer range represented by the level 49 of the BSR table 1 is smaller, and the represented data amount of the LCG is more accurate, which makes the error of the base station estimating the data amount of the UE smaller, so the UE selects the level 49 of the BSR table 1.

When the user equipment reports the buffer status reports of four logic channel groups simultaneously, i.e., reports the Long BSR, if it is judged that the maximum value of the buffer data amounts of the logic channel groups is smaller than the maximum data-amount-range boundary value of the original buffer status level format, the buffer status reports of the logic channel groups are reported by using the original buffer status level format; if it is judged that maximum value of the buffer data amounts of the logic channel groups is not smaller than the maximum data-amount-range boundary value of the original buffer status level format, the buffer status reports of the logic channel groups are reported by using the newly-added buffer status level format. Specifically, when the BSR levels of different LCGs in one BSR are obtained from the same BSR table, i.e., it is impossible that both BSR levels represented by the BSR table 0 and BSR levels represented by the BSR table 1 exist in the same BSR, the BSR levels of all LCGs are either the BSR levels in the BSR table 0 or the BSR levels in the BSR table 1. The BSR table is selected by comparing the LCG with the maximum actual buffer size and the threshold for selecting the BSR table. By taking Table 3 as an example, if $529390<BS_{LCG1}<=619778$, $146<BS_{LCG2}<=171$, $BS_{LCG3}=0$, $BS_{LCG4}=0$, then when the value of $BS_{LCG1}$ is greater than the selecting threshold, which for example is 150000, the UE selects the BSR table 1, and the reported BSR levels of each LCG in the BSR are respectively $BSR_{LCG1}=56$, $BSR_{LCG2}=4$, $BSR_{LCG3}=0$, $BSR_{LCG3}=0$. If $5476<BS_{LCG1}<=6411$, $146<BS_{LCG2}<=171$, $BS_{LCG3}=0$, $BS_{LCG4}=0$, then the UE can select the BSR table 0 and searches for the BSR levels, and $BSR_{LCG1}=42$, $BSR_{LCG2}=19$, $BSR_{LCG3}=0$, $BSR_{LCG3}=0$ when reporting.

When a plurality of BSRs occur during one Transmission Time Interval (TTI), for example, a Regular BSR is transmitted and a Padding BSR may also be carried, then the same BSR table should be used for the BSRs of the same BSR format. However, different BSR formats, for example, Long BSR and Short BSR or Truncated BSR, are independent from each other when selecting BSR tables, i.e., different BSR tables can be selected.

Figure 8:
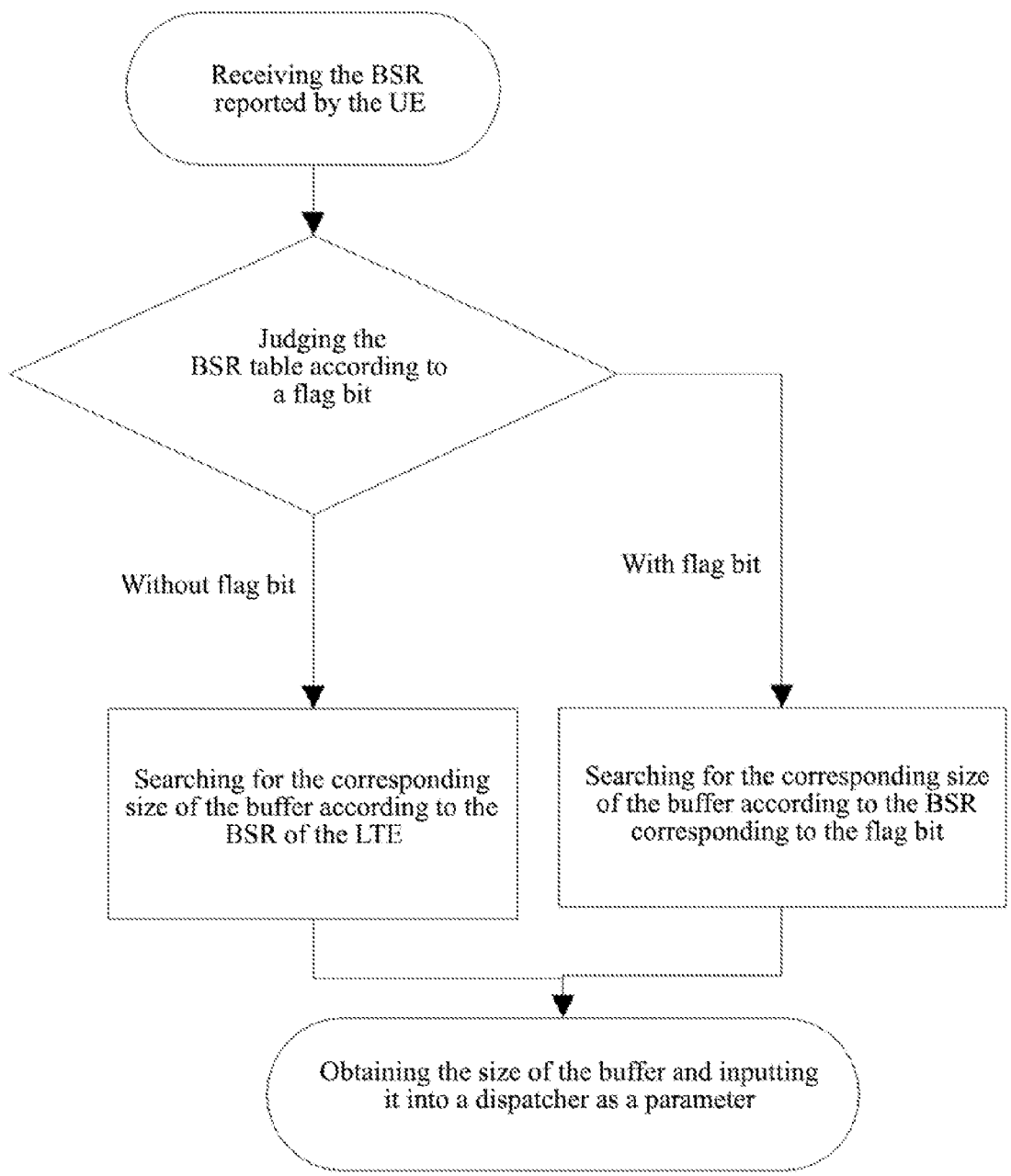
FIG. 8 illustrates the manner of the eNB distinguishing the original buffer status level format from the newly-added buffer status level format through the flag bit identifying the BSR table according to an example.

Since the base station does not participate during the above process of selecting the table, and is also unable to know the BSR table selected by the UE. Therefore, when the UE reports the BSR, if the BSR table 1 is used when an identifier needs to be carried to indicate, the BSR level in the reported BSR is the corresponding BSR table 1, and if the identifier is not carried, then the defaulted BSR table 0 is corresponded. This identifier can be distinguished through the R bit (set as 1) in the MAC sub-header corresponding to the BSR or the new LCID (for example, short BSR=01011, Truncated BSR=01100, Long BSR=01101), as shown in FIG. 8.

The existing UE does not know the version of the base station, and in order to prevent the UE from reporting the BSR levels in the BSR table 1 in the base station of the LTE, the network indicates to the UE the capability of the base station or whether the base station supports the UE to report new BSR tables through broadcasting or a dedicated signaling (including RRC signaling or MAC CE). During the switching process, the indication information of the target base station is sent to the UE through a switching command or MAC CE. When the UE receives the indication sent by the base station for allowing the UE to report a BSR table other than the BSR table 0, the UE selects and reports the BSR table according to the above process; when the UE does not receive the indication sent by the base station for allowing the UE to report a BSR table other than the BSR table 0, the UE only uses the BSR table 0 to report the BSR.

Mode two, the buffer status level format is determined by the eNB.

This mode two may further comprise the following five implementing methods.

(1) The eNB determines which one of the original buffer status level format and the newly-added buffer status level format the user equipment should use according to traffic flow, data transmission rate or service attribute of the user equipment, and informs the user equipment of the determination result. After receiving the determination result, the UE reports the buffer status of the logic channel using the buffer status level format instructed by the eNB.

Different from the mode where the table to be used is determined by the UE, in the mode where the table to be used is determined by the eNB, the eNB designates, through dedicated RRC signaling or MAC CE, the BSR table to be used by the UE after receiving the signaling. For example, the eNB informs the UE of which BSR table is to be used through broadcasting or dedicated signaling (including RRC signaling, for example, an optional identifier is added to the dedicated signaling IE MAC-MainConfig to identify that the BSR table 1 is to be selected, and it is indicated that the BSR table 0 is selected when no identifier is filled, or MAC CE, for example, a new MAC CE sub-header is added, and the value of the LCID is configured with a new value to indicate that the MAC CE sub-header is a replacing identifier of the BSR table, and the UE replaces the BSR table after receiving MAC CE; or LCID1 indicates that BSR table 0 is to be used while LCID2 indicates that BSR table 1 is to be used).

The eNB can use the traffic flow of the user as the basis for selecting the BSR table. For example, under the initial status, the UE uses the BSR table 0 to determine and report the BSR level, and when the eNB detects that the traffic flow of the UE increases and exceeds the preset threshold, the eNB instructs the UE to use the BSR table 1 through broadcasting or dedicated signaling, and after the UE receives the instruction, it uses the BSR table 1 to determine and report the BSR level, and meanwhile the base station also uses the BSR table 1 to analyze the BSR reported by the UE; in the subsequent process, when the eNB detects that the traffic flow of the UE decreases and is below the preset threshold, the eNB instructs the UE to use the BSR table 0 through broadcasting or dedicated signaling, and after the UE receives the instruction, it uses the BSR table 0 to determine and report the BSR level, and meanwhile the base station also uses the BSR table 0 to analyze the BSR reported by the UE.

The eNB may also use the data transmission rate of the user as the basis for selecting the BSR table. For example, when the eNB judges that the data transmission rate of the UE is greater than the threshold preset by the system, the eNB instructs the UE to use the BSR table 1, otherwise, use the BSR table 0.

The eNB may also use the service attribute of the user as the basis for selecting the BSR table. For example, when the eNB judges that the level of the service used by the UE is greater than the level value preset by the system, the eNB instructs the UE to use the BSR table 1, otherwise, use the BSR table 0.

Different from the above method of the UE determining the table to be used, in the present invention, when the UE reports the BSR, the base station knows the BSR table currently used by the UE, so no new indication is needed to indicate the BSR table currently used by the UE.

(2) The UE sends a request to the eNB to request for using the BSR table 1, and after the eNB receives this request, it accepts or rejects this request. When the eNB accepts this request, it returns an agreement message to the UE, and the UE uses the BSR table 1 to report the BSR. When the eNB rejects this request, it returns a rejection message to the UE, and the UE continues to use the BSR table 0. When the eNB does not return any message, it may be considered that it agrees to the request.

The UE sends a request to the eNB to request for using the BSR table 0, and after the eNB receives this request, it accepts or rejects this request. When the eNB accepts this request, it returns an agreement message to the UE, and the UE uses the BSR table 0 to report the BSR. When the eNB rejects this request, it returns a rejection message to the UE, and the UE continues to use the BSR table 1. When the eNB does not return any message, it may be considered that it agrees to the request.

(3) When the UE judges that it needs to modify the BSR table, the UE sends a message of requesting for modifying the BSR table, and the eNB indicates to the UE the BSR table to be used for modification.

For example, when the UE judges that the traffic flow increases and exceeds a particular threshold, the UE reports a measurement report to request for using the BSR table 1, and the eNB instructs the UE to use the BSR table 1 after receiving the request; when the UE judges that the traffic flow decreases and is below a particular threshold, the UE reports a measurement report to request for using the BSR table 0, and the eNB instructs the UE to use the BSR table 0 after receiving the request.

(4) When the UE uses the maximum data-amount-range boundary value or the minimum non-zero data-amount-range boundary value in the BSR table, the UE reports the maximum value or the minimum non-zero value to the eNB, and when the eNB judges that the UE needs to modify the BSR table according to the maximum value or the minimum non-zero value, the eNB indicates to the UE the BSR table that the UE should use.

After the eNB receives the maximum data-amount-range boundary value or the minimum non-zero data-amount-range boundary value reported by the UE, the eNB deduces that the scope of the buffer size of the current BSR table may be restricted, and the BSR table needs to be replaced.

For example, when the UE uses the BSR table 0, and the value of the BSR reported by the UE is 63, it indicates that the current buffer BS>150000, and the eNB judges that the data amount value of the LCG buffer of the UE can be represented more accurately if the UE uses the BSR table 1, and instructs the UE to use the BSR table 1.

(5) The UE periodically reports the level values in the BSR table used by itself to the eNB, and when the eNB judges that the UE needs to modify the BSR table, the eNB indicates to the UE the BSR table that the UE should use.

For example, when the UE uses the BSR table 0, and the level values in the BSR tables, which are used by the UE and reported by the UE, received by the eNB are all between 60-63 continuously for several times, the eNB judges that the current buffer occupation ratio of the UE is very high and may further increase, and the eNB instructs the UE to use the BSR table 1.

Still for example, in a case where the BSR table 1 uses table 3, when the UE uses the BSR table 1, and the level values in the BSR tables that are used by the UE and reported by the UE and received by the eNB are all between 0-3 continuously for several times, the eNB judges that the current buffer occupation ratio of the UE is very low and may further decrease, and the eNB instructs the UE to use the BSR table 0.

After continuously receiving a plurality of BSR level values that meet the condition for triggering replacement of the BSR table, the eNB instructs the UE to replace the BSR table, which can ensure the correctness of decision, reduce frequent replacements of BSR table when the buffer occupation ratio varies within a large range during a short time period, and reduce signaling interaction and resource waste.

This example further provides a user equipment for realizing buffer status reporting, and the user equipment is configured to:

report a buffer status of a logical channel by using one of an original buffer status level format and a newly-added buffer status level format; wherein, the newly-added buffer status level format comprises a plurality of data-amount-range boundary values which are higher than a maximum data-amount-range boundary value in the original buffer status level format.

Wherein, the newly-added buffer status level format comprises a plurality of data amount levels, each of which corresponds to one data amount range; the data amount range corresponding to a last data amount level in the original buffer status level format refers to a range of values larger than the maximum data-amount-range boundary value, the data amount ranges corresponding to last M levels in the newly-added buffer status level format are data amount ranges that are larger than the maximum data-amount-range boundary value and have increasing values in order; M is an integer smaller than or equal to a number of data amount levels in the newly-added buffer status level format.

The user equipment is further configured to:

select a buffer status level format to be used according to a data amount of a buffer in a logic channel group, and reporting a buffer status report of the logic channel group.

Wherein, the user equipment is configured to select the buffer status level format to be used according to a data amount of a buffer in a logic channel group, and report a buffer status report of the logic channel group in the following way:

when the buffer status report of only one logic channel group is reported, if it is judged that the buffer data amount of the logic channel group is smaller than the maximum data-amount-range boundary value of the original buffer status level format, report the buffer status report of the logic channel group using the original buffer status level format; if it is judged that the buffer data amount of the logic channel group is not smaller than the maximum data-amount-range boundary value of the original buffer status level format, report the buffer status report of the logic channel group using the newly-added buffer status level format; when the buffer status reports of four logic channel groups are reported simultaneously, if it is judged that a maximum value of the buffer data amounts of the logic channel groups is smaller than the maximum data-amount-range boundary value of the original buffer status level format, report the buffer status reports of the logic channel groups using the original buffer status level format; if it is judged that maximum value of the buffer data amounts of the logic channel groups is not smaller than the maximum data-amount-range boundary value of the original buffer status level format, report the buffer status reports of the logic channel groups using the newly-added buffer status level format.

The user equipment is further configured such that:

receive a determination result sent from an evolved Node B after the evolved Node B determines which one of the original buffer status level format and the newly-added buffer status level format the user equipment should us according to traffic flow, data transmission rate or service attribute of the user equipment.

The above examples are only preferred examples of the present invention, and are not used to limit the present invention. according to the inventive content of the present invention, there may be many other examples. A person having ordinary skill in the art can make various corresponding modifications and transformations according to the present invention without departing from the spirit and essence of the present invention. Any modification, equivalent substitution, improvement and so on made within the spirit and principle of the present invention shall all fall into the protection scope of the present invention.

Those of ordinary skill in the art should understand that the whole or part of steps of the above-mentioned method may be completed by instructing relevant hardware with a program, the program may be stored in a computer readable storage medium such as a read only memory, a disk or a compact disk. Alternatively, the whole or part of steps of the above-mentioned embodiments may also be implemented using one or more integrated circuits. Correspondingly, each module/unit in the above-mentioned embodiments may be implemented in a form of hardware, or may be implemented in a form of software function module. The present invention is not limited to any specific form of combination of hardware and software.

INDUSTRIAL APPLICABILITY

The present invention can improve the accuracy of the user reporting the buffer status in a LTE-A system.

What is claimed is:

1. A method for realizing buffer status reporting, comprising:
when an evolved Node B (eNB) determines whether a user equipment should use an original buffer status level format, which is also referred as buffer status report (BSR) table or use one of newly-added BSR tables for buffer status reporting, the user equipment being informed by the eNB of which BSR table is to be used, after receiving a determination result from the eNB, and reporting a buffer status of a logical channel by using the original BSR table or one of the newly-added BSR tables indicated by the determination result; wherein, the newly-added BSR tables comprise a plurality of data-amount-range boundary values which are higher than a maximum data-amount-range boundary value in the original BSR table;
when the user equipment determines whether to use the original BSR table or use one of the newly-added BSR tables according to a data amount of a buffer in a logic channel group, the user equipment selecting a BSR table to be used from the original BSR table and the newly-added BSR tables, and reporting a buffer status of a logical channel by using the selected BSR table;
wherein, the step of the user equipment selecting a BSR table to be used according to a buffer data amount in a logic channel group, and reporting a buffer status report of the logic channel group comprises:
when the user equipment only reports the buffer status report of one logic channel group, if it is judged that the buffer data amount of the logic channel group is smaller than the maximum data-amount-range boundary value of the original BSR table, reporting the buffer status report of the logic channel group using the original BSR table; if it is judged that the buffer data amount of the logic channel group is not smaller than the maximum data-amount-range boundary value of the original BSR table, reporting the buffer status report of the logic channel group using the newly-added BSR table;
when the user equipment reports the buffer status reports of four logic channel groups simultaneously, if it is judged that a maximum value of the buffer data amounts of the logic channel groups is smaller than the maximum data-amount-range boundary value of the original BSR table, reporting the buffer status reports of the logic channel groups using the original BSR table; if it is judged that maximum value of the buffer data amounts of the logic channel groups is not smaller than the maximum data-amount-range boundary value of the original BSR table, reporting the buffer status reports of the logic channel groups using the newly-added BSR table.

2. The method according to claim 1, wherein,
the newly-added BSR table comprises a plurality of data amount levels, each of which corresponds to one data amount range; the data amount range corresponding to a last data amount level in the original BSR table refers to a range of values larger than the maximum data-amount-range boundary value, the data amount ranges corresponding to last M levels in the newly-added BSR table are data amount ranges that are larger than the maximum data-amount-range boundary value and have increasing values in order; M is an integer smaller than or equal to a number of data amount levels in the newly-added BSR table.

3. The method according to claim 1, wherein, in the step of the eNB determining which one of the original BSR table and the newly-added BSR table the user equipment should use,
the eNB determines which one of the original BSR table and the newly-added BSR tables the user equipment use according to traffic flow, data transmission rate or service attribute of the user equipment.

4. A system for realizing buffer status reporting, comprising a user equipment and an evolved Node B (eNB), wherein,
the eNB is configured to: determine whether a user equipment should use an original buffer status level format, which is also referred as buffer status report (BSR) table or use one of newly-added BSR tables for buffer status reporting;
the user equipment is configured to:
when the user equipment is informed by the eNB of which BSR table is to be used, receive a determination result from the eNB, and report a buffer status of a logical channel by using the original BSR table or one of the newly-added BSR tables indicated by the determination result;

wherein, the newly-added BSR tables comprises a plurality of data-amount-range boundary values which are higher than a maximum data-amount-range boundary value in the original BSR table; and when the user equipment determines whether to use the original BSR table or use one of the newly-added BSR tables according to a data amount of a buffer in a logic channel group, select a BSR table to be used from the original BSR table and the newly-added BSR tables, and report a buffer status of a logical channel by using the selected BSR table;

wherein, when the buffer status report of only one logic channel group is reported, if it is judged that the buffer data amount of the logic channel group is smaller than the maximum data-amount-range boundary value of the original BSR table, report the buffer status report of the logic channel group using the original BSR table; if it is judged that the buffer data amount of the logic channel group is not smaller than the maximum data-amount-range boundary value of the original BSR table, report the buffer status report of the logic channel group using the newly-added BSR table; when the buffer status reports of four logic channel groups are reported simultaneously, if it is judged that a maximum value of the buffer data amounts of the logic channel groups is smaller than the maximum data-amount-range boundary value of the original BSR table, report the buffer status reports of the logic channel groups using the original BSR table; if it is judged that maximum value of the buffer data amounts of the logic channel groups is not smaller than the maximum data-amount-range boundary value of the original BSR table, report the buffer status reports of the logic channel groups using the newly-added BSR table.

5. The system according to claim 4, wherein,
the newly-added BSR table comprises a plurality of data amount levels, each of which corresponds to one data amount range; the data amount range corresponding to a last data amount level in the original BSR table refers to a range of values larger than the maximum data-amount-range boundary value, the data amount ranges corresponding to last M levels in the newly-added BSR table are data amount ranges that are larger than the maximum data-amount-range boundary value and have increasing values in order; M is an integer smaller than or equal to a number of data amount levels in the newly-added BSR table.

6. The system according to claim 4, wherein,
the eNB is further configured to determine which one of the original BSR table and the newly-added BSR tables the user equipment use according to traffic flow, data transmission rate or service attribute of the user equipment.

7. A user equipment for realizing buffer status reporting, comprising a processor which is configured to:

when the user equipment is informed by an evolved Node B (eNB) of which buffer status level format, which is also referred as buffer status report (BSR) table, is to be used, receive a determination result from the eNB after the eNB determines whether the user equipment should use an original BSR table or use one of newly-added BSR tables for buffer status reporting, and report a buffer status of a logical channel by using the original BSR table or one of the newly-added BSR tables indicated by the determination result;

wherein, the newly-added BSR tables comprise a plurality of data-amount-range boundary values which are higher than a maximum data-amount-range boundary value in the original BSR table; and when the user equipment determines whether to use the original BSR table or use one of the newly-added BSR tables according to a data amount of a buffer in a logic channel group, select a BSR table to be used from the original BSR table and the newly-added BSR tables, and report a buffer status of a logical channel by using the selected BSR table;

wherein, when the buffer status report of only one logic channel group is reported, if it is judged that the buffer data amount of the logic channel group is smaller than the maximum data-amount-range boundary value of the original BSR table, report the buffer status report of the logic channel group using the original BSR table; if it is judged that the buffer data amount of the logic channel group is not smaller than the maximum data-amount-range boundary value of the original BSR table, report the buffer status report of the logic channel group using the newly-added BSR table; when the buffer status reports of four logic channel groups are reported simultaneously, if it is judged that a maximum value of the buffer data amounts of the logic channel groups is smaller than the maximum data-amount-range boundary value of the original BSR table, report the buffer status reports of the logic channel groups using the original BSR table; if it is judged that maximum value of the buffer data amounts of the logic channel groups is not smaller than the maximum data-amount-range boundary value of the original BSR table, report the buffer status reports of the logic channel groups using the newly-added BSR table.

8. The user equipment according to claim 7, wherein,
the newly-added BSR table comprises a plurality of data amount levels, each of which corresponds to one data amount range; the data amount range corresponding to a last data amount level in the original BSR table refers to a range of values larger than the maximum data-amount-range boundary value, the data amount ranges corresponding to last M levels in the newly-added BSR table are data amount ranges that are larger than the maximum data-amount-range boundary value and have increasing values in order; M is an integer smaller than or equal to a number of data amount levels in the newly-added BSR table.

* * * * *